United States Patent
Liu et al.

(10) Patent No.: US 11,932,778 B2
(45) Date of Patent: Mar. 19, 2024

(54) POLYMER EMULSION AND ANTIMICROBIAL COATING COMPOSITION COMPRISING THE SAME

(71) Applicant: Rohm and Haas Company, Collegeville, PA (US)

(72) Inventors: Han Liu, Shanghai (CN); Xiangting Dong, Shanghai (CN); Qingwei Zhang, Shanghai (CN); Ling Li, Shanghai (CN)

(73) Assignee: Rohm and Haas Company, Collegeville, PA (US)

( * ) Notice: Subject to any disclaimer, the term of this patent is extended or adjusted under 35 U.S.C. 154(b) by 517 days.

(21) Appl. No.: 15/759,369

(22) PCT Filed: Sep. 22, 2015

(86) PCT No.: PCT/CN2015/090228
§ 371 (c)(1),
(2) Date: Mar. 12, 2018

(87) PCT Pub. No.: WO2017/049453
PCT Pub. Date: Mar. 30, 2017

(65) Prior Publication Data
US 2018/0208778 A1    Jul. 26, 2018

(51) Int. Cl.
| | | |
|---|---|---|
| C09D 5/14 | (2006.01) | |
| A01N 59/16 | (2006.01) | |
| C09D 133/08 | (2006.01) | |
| C09D 139/04 | (2006.01) | |
| C08K 3/28 | (2006.01) | |
| C08K 5/14 | (2006.01) | |
| C09D 125/08 | (2006.01) | |

(52) U.S. Cl.
CPC ............. *C09D 5/14* (2013.01); *A01N 59/16* (2013.01); *C09D 133/08* (2013.01); *C09D 139/04* (2013.01); *C08K 3/28* (2013.01); *C08K 5/14* (2013.01); *C09D 125/08* (2013.01)

(58) Field of Classification Search
CPC ....................................................... C09D 5/14
See application file for complete search history.

(56) References Cited

U.S. PATENT DOCUMENTS

| | | |
|---|---|---|
| 5,945,032 A | 8/1999 | Breitenbach et al. |
| 7,390,774 B2 | 6/2008 | Ghosh et al. |
| 9,034,352 B2 | 5/2015 | Chia et al. |
| 2004/0151910 A1* | 8/2004 | Koller ............... C08F 2/44 428/403 |
| 2005/0227895 A1 | 10/2005 | Ghosh et al. |
| 2011/0243882 A1 | 10/2011 | Dong et al. |

FOREIGN PATENT DOCUMENTS

| | | |
|---|---|---|
| AU | 2008237595 A1 | 6/2009 |
| CA | 2679154 A1 | 12/2008 |
| EP | 2371221 A2 | 10/2011 |
| WO | 0230204 A1 | 4/2002 |
| WO | 2014000638 A1 | 1/2014 |

OTHER PUBLICATIONS

Bohn et al. Uniform poly(ethylene glycol): a comparative study. Polymer Journal. (Year: 2019).*
ChemBlink. Polyethyleneglycol tridecyl ether phosphate. Rodafac. Retrieved: (Year: 2021).*
Supplementary European Search Report for the corresponding EP application No. EP15904341; dated May 8, 2019; 7 pages.

* cited by examiner

*Primary Examiner* — Sarah Alawadi
(74) *Attorney, Agent, or Firm* — Susan M. Zerull

(57) ABSTRACT

The present invention provides an antimicrobial coating composition comprising (i) a polymer emulsion and (ii) from 20 ppm to 6000 ppm, by dry weight based on total dry weight of the coating composition, a silver, and the polymer emulsion comprises, as polymerized units, (a) ethylenically unsaturated nonionic monomers, and (b) from 0.01% to 20%, by dry weight based on total dry weight of the polymer emulsion, heterocyclic group-containing monomers.

14 Claims, No Drawings

POLYMER EMULSION AND ANTIMICROBIAL COATING COMPOSITION COMPRISING THE SAME

FIELD OF THE INVENTION

The present invention relates to a polymer emulsion and an antimicrobial coating composition made therefrom with improved color stability upon exposure to heat.

INTRODUCTION

Silver ion or silver element is used in coating formulations to provide antimicrobial performance. The higher the silver content is in the coating, the better the antimicrobial performance is. However, when the silver content is at a concentration of higher than 20 ppm in the coating, the coating may turn yellow or even darker upon exposure to heat or sunlight. It is desired to provide a silver-containing antimicrobial coating composition with better discoloration resistance.

SUMMARY OF THE INVENTION

The present invention provides an antimicrobial coating composition comprising (i) a polymer emulsion and (ii) from 20 ppm to 6000 ppm, by dry weight based on total dry weight of the coating composition, a silver, wherein the polymer emulsion comprises, as polymerized units, (a) ethylenically unsaturated nonionic monomers, and (b) from 0.01% to 20%, by dry weight based on total dry weight of the polymer emulsion, heterocyclic group-containing monomers.

DETAILED DESCRIPTION OF THE INVENTION

The present invention provides an antimicrobial coating composition comprising (i) a polymer emulsion and (ii) from 20 ppm to 6000 ppm, preferably from 100 ppm to 3000 ppm, and more preferably from 200 ppm to 1500 ppm, by dry weight based on total dry weight of the coating composition, a silver.

Polymer Emulsion

The polymer emulsion comprises, as polymerized units, (a) ethylenically unsaturated nonionic monomers; and (b) from 0.01% to 20%, preferably from 0.05% to 10%, and more preferably from 0.1% to 5% by dry weight based on total dry weight of the polymer emulsion, heterocyclic group-containing monomers.

The mole ratio of the heterocyclic groups in the heterocyclic group-containing monomers to the silver is over 4, preferably over 7, and more preferably over 9.

As used herein, the term "nonionic monomers" refers to monomers that do not bear an ionic charge between pH=1-14. Suitable examples of the ethylenically unsaturated nonionic monomers include alkyl esters of (methyl) acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, and any combinations thereof; (meth) acrylonitrile; (meth)acrylamide; amino-functional and ureido-functional monomers such as hydroxyethyl ethylene urea methacrylate; monomers bearing acetoacetate-functional groups such as acetoacetoxyethyl methacrylate (AAEM); monomers bearing carbonyl-containing groups such as diacetone acrylamide (DAAM); ethylenically unsaturated monomers having a benzene ring such as styrene and substituted styrenes; butadiene; α-olefins such as ethylene, propylene, and 1-decene; vinyl acetate, vinyl butyrate, vinyl versatate and other vinyl esters; vinyl monomers such as vinyl chloride and vinylidene chloride; glycidyl (meth)acrylate; and any combinations thereof.

In a preferred embodiment, the ethylenically unsaturated nonionic monomer is selected from styrene, $C_2$-$C_{12}$ alkyl esters of (methyl) acrylic acids, derivatives thereof, and any combinations thereof.

The heterocyclic group-containing monomers are polymerizable derivatives of imidazole, thiophene, pyrrole, oxazole, thiazole, tetrazole, pyridine, pyridazine, pyrimidine, pyrazine, azole, indazole, triazole, their isomers, and any combinations thereof. Suitable examples of the heterocyclic group-containing monomer include 1-vinyl imidazole, N-vinyl imidazole, vinyl benzotriazole, vinyl methyl-benzotriazole, vinyl benzothiazole, vinyl methylbenzothiazole, vinyl benzimidazole and vinyl methyl benzimidazole. Preferably, the heterocyclic group-containing monomer is selected from 1-vinyl imidazole, vinyl benzotriazole and vinyl benzimidazole.

Optionally, the polymer emulsion further comprises, as polymerized units, by dry weight based on total dry weight of the polymer emulsion, (c) from 0.01% to 5%, preferably from 0.1% to 4%, and more preferably from 0.3% to 3%, stabilizer monomers.

Suitable examples of the stabilizer monomers include sodium styrene sulfonate (SSS), sodium vinyl sulfonate (SVS), 2-acrylamido-2-methylpropanesulfonic acid (AMPS), acrylamide (AM), acrylic acid (AA), methylacrylic acid (MAA), itaconic acid (IA), and any combinations thereof.

The polymerization of the polymer emulsion can be any methods known in the art, including emulsion polymerization, mini-emulsion polymerization, and mechanical dispersing technology.

Silver

In the present invention, silver is incorporated into the coating composition in silver element, i.e., $Ag^0$, or in oxidation state silver ion, i.e., $Ag^0$ and is provided in silver solutions. Suitable examples of the silver solutions include silver nitrate, silver acetate, silver citrate, silver iodide, silver lactate, silver picrate, silver sulfate in deionized ("DI") water, and any combinations thereof. Preferred examples of the silver solutions are silver nitrate and silver iodide. Besides DI water, other liquid mediums can also be used, such as water, aqueous buffered solutions and organic solutions such as polyethers or alcohols. The concentration of the silver in these solutions can vary from the concentration required to add a known quantity of silver, i.e., from 20 ppm to 6000 ppm, preferably from 100 ppm to 3000 ppm, and more preferably from 200 ppm to 1500 ppm, by dry weight based on total dry weight of the coating composition as in the present invention, to the antimicrobial coating composition to a saturated silver solution. Commercially available silver solutions include SILVADUR™ 900, SILVADUR 930, SILVADUR 961 and SILVADUR ET from The Dow Chemical Company, and IRGAGUARD™ B 5000, IRGAGUARD B 5120, IRGAGUARD B 6000, IRGAGUARD D 1071 and IRGAGUARD H 6000 from BASF Company.

The Antimicrobial Coating Composition

The coating composition may further comprise pigments or extenders.

As used herein, the term "pigment" refers to a particulate inorganic material which is capable of materially contributing to the opacity or hiding capability of a coating. Pigments typically have a refractive index of equal to or greater than 1.8 and include zinc oxide, zinc sulfide, barium sulfate, and barium carbonate. For the purpose of clarity, titanium dioxide particles of the present invention are not included in the "pigment" of the present invention.

The term "extender" refers to a particulate inorganic materials having a refractive index of less than or equal to 1.8 and greater than 1.3 and include calcium carbonate, aluminium oxide ($Al_2O_3$), clay, calcium sulfate, aluminosilicate, silicate, zeolite, mica, diatomaceous earth, solid or hollow glass, and ceramic bead.

PVC (pigment volume concentration) of the coating composition is calculated as follows, PVC (%)=[volume of pigment(s)+volume of extender(s)]/total dry volume of coating.

In a preferred embodiment, the coating composition has a PVC of from 10% to 75%, and preferably from 20% to 70%.

Optionally, the coating composition of the present invention further comprises, by dry weight based on total dry weight of the coating composition, from 0.004% to 10%, preferably from 0.05% to 2%, and more preferably from 0.1% to 2%, an oxidant.

Suitable examples of the oxidant include peroxides such as peroxide hydrogen, benzoyl peroxide, tert-butyl hydro peroxide, di-tert-butyl hydro peroxide, tert-butyl peroxy benzoate and tert-butyl peroxy-2-ethyl-hexanoate; halogen acids such as chloric acid, bromic acid and iodic acid; hypohalous acid such as hypochlorous acid, hypobromous acid and hypoiodous acid; halous acid such as chlorous acid; perhalogen acid such as perchloric acid, perbromic and periodic acid; and their lithium, sodium and calcium salts such as lithium perchlorate, potassium chlorate, sodium chlorite, potassium bromate, sodium iodate, sodium hypochlorite, calcium chlorate and calcium iodate; and any combinations thereof.

Preparation of the Coating Composition

The preparation of the coating composition involves the process of selecting and admixing appropriate coating ingredients in the correct proportions to provide a coating with specific processing and handling properties, as well as a final dry coating film with the desired properties.

Application of the Coating Composition

The coating composition may be applied by conventional application methods such as brushing, roller application, and spraying methods such as air-atomized spray, air-assisted spray, airless spray, high volume low pressure spray, and air-assisted airless spray.

Suitable substrates for coating application include concrete, cement board, medium-density fiberboard (MDF) and particle board, gypsum board, wood, stone, metal, plastics, wall paper and textile, etc. Preferably, all the substrates are pre-primed by waterborne or solvent-borne primers.

Examples

I. Raw Materials

| Abbreviation | Chemical |
| --- | --- |
| BA | butyl acrylate |
| MMA | methyl methacrylate |
| (M)AA | (methyl) acrylic acid |
| AM | acrylamide |
| VI | vinyl imidazole |
| EDTA | ethylene diamine tetraacetic acid |
| APS | ammonia persulfate |
| t-BHP | tert-butyl hydroperoxide |
| IAA | isoascorbic acid |

| Chemical | Supplier |
| --- | --- |
| RHODAFAC ™ RS-610/A25 anionic phosphate ester surfactant | Solvay Chemical Company |
| DISPONIL ™ FES 32 fatty alcohol polyglycol ether sulfate sodium salt surfactant | BASF Company |

II. Test Methods

1. Heat Stability Test 100 mL of each coating composition was added into a 200 mL heat-stable plastic container and placed into a 50° C. oven for at least 10 days. Heat stability was evaluated by observing and comparing the appearances of the coating compositions before and after the heating. The appearance change for each coating composition was scored as from level 4 to level 1 according to the below rule:

| Appearance change | Level score |
| --- | --- |
| no visible change | 4 |
| slight discoloration | 3 |
| obvious discoloration | 2 |
| heavy discoloration | 1 |

III. Examples

1. Preparation for Polymer Emulsion 3 (Binder 3)

A monomer mixture was prepared by mixing 336.04 g of DI water, 7.50 g of AM, 30.48 g of MAA, 693.89 g of BA, 767.00 g MMA, 7.58 g of VI and 93.76 g of RHODAFAC™ RS-610/A25 anionic phosphate ester surfactant. Then, 818 g of DI water was added at an agitation rate of 130 rpm into a 1-gallon vessel equipped with a reflux condenser and a stirrer. The reaction temperature was raised to 83° C., and 7.26 g of DISPONIL™ FES 32 fatty alcohol polyglycol ester sulfate sodium salt surfactant was introduced into the reaction vessel. Thereafter, a buffer solution of 3.02 g $Na_2CO_3$ in 27.78 g DI water, 82.40 g of the monomer mixture, and an initiator solution of 3.01 g APS in 24.08 g of DI water were injected into the reaction vessel. The reaction mixture was being held at a temperature between 76 and 86° C. for 5 minutes. Thereafter, the remainder of the monomer mixture and a solution of 1.37 g APS in 148.17 g DI water were added into the reaction vessel over the span of 120 minutes at 85° C. Then, the content of the reaction vessel was cooled to room temperature, and a reductant solution of 0.84 g IAA in 40.75 g DI water, and an initiator solution of 0.91 g t-BHP and 0.40 g $H_2O_2$ in 38.89 g DI water were injected into the reaction vessel when the temperature was dropped to 70° C. Then a solution of 2.69 g $H_2O_2$ in 5.56 g DI water was added into the reaction vessel when the temperature was dropped to 55° C. Binder 3 prepared has a solid of 47.5%, a particle size of 125 nm, and a pH of 6.01.

2. Preparation of Polymer Emulsions 1-2 and 4-5 (Binders 1-2 and 4-5)

Polymer Emulsions 1-2 and 4-5 were prepared according to the same procedure as described above for preparing Polymer Emulsion 1 with different VI monomer concentrations as described in Table 1.

TABLE 1

|  | VI %* |
|---|---|
| Binder 1 | 1.96% |
| Binder 2 | 0.98% |
| Binder 3 | 0.49% |
| Binder 4 | 0.10% |
| Binder 5 | — |

*by dry weight based on total dry weight of the polymer emulsion

3. Preparation of Coating Composition 1

Coating Composition 1 was prepared by adding a solution of 2.40 g silver nitrate in 45.65 g DI water into 1000 g Binder 1. The silver concentration is 3229 ppm by dry weight based on total dry weight of the coating composition. The mole ratio of the heterocyclic groups in the heterocyclic group-containing monomer to the silver is 7.

4. Preparation of Coating Compositions 2, 4-6 and 8 (Coatings) and Comparative Coating Compositions 3, 7 and 9 (Comp. Coatings)

Coating compositions 2, 4-6, and 8 and Comp. Coating compositions 3, 7 and 9 were prepared according to the similar procedure for preparing Coating Composition 1, with different binders and silver dosages as described in Table 2.

TABLE 2

|  | Binder | VI* | EDTA* | Silver (ppm) | VI/EDTA: Silver (by mole) |
|---|---|---|---|---|---|
| Coating 1 | Binder 1 | 1.96% | — | 3229 | 7 |
| Coating 2 | Binder 2 | 0.98% | — | 2821 | 4 |
| Comp. Coating 3 | Binder 3 | 0.49% | — | 2796 | 2 |
| Coating 4 | Binder 2 | 0.98% | — | 1612 | 7 |
| Coating 5 | Binder 3 | 0.49% | — | 1398 | 4 |
| Coating 6 | Binder 3 | 0.49% | — | 621 | 9 |
| Comp. Coating 7 | Binder 4 | 0.1% | — | 577 | 2 |
| Coating 8 | Binder 4 | 0.1% | — | 200 | 5.8 |
| Comp. Coating 9 | Binder 5 | — | — | 200 | 1 |
| Comp. Coating 10 | Binder 5 | — | 0.35% | 200 | 5 |
| Comp. Coating 11 | Binder 5 | — | 0.70% | 200 | 10 |

*by dry weight based on total dry weight of the polymer emulsion

IV. Results

TABLE 3

|  | Heat stability level score |
|---|---|
| Coating 1 | 4 |
| Coating 2 | 4 |
| Comp. Coating 3 | 2 |
| Coating 4 | 4 |
| Coating 5 | 3 |
| Coating 6 | 4 |
| Comp. Coating 7 | 2 |
| Coating 8 | 4 |
| Comp. Coating 9 | 1 |

TABLE 3-continued

|  | Heat stability level score |
|---|---|
| Comp. Coating 10 | 1 |
| Comp. Coating 11 | 1 |

As shown in Table 3, Coating Composition 8 and Comp. Coating Composition 9 both comprised 200 ppm by dry weight based on total dry weight of the coating composition, silver. Coating composition 8 further comprised 0.1% by dry weight based on total dry weight of the polymer emulsion, the heterocyclic group-containing monomer, i.e., VI; and its mole ratio of the heterocyclic group in the heterocyclic group-containing monomer to the silver is 5.8. The heat stability of Coating Composition 8 is much better than that of Comp. Coating Composition 9. It suggested the significant role played by the heterocyclic group-containing monomer in coating heat stability.

Coating Compositions 1 to 2, 4 to 6, and 8 comprised different and required silver and VI dosages, and showed similar benefits to coating heat stability.

Comparative Coating Composition 3 comprised insufficient VI monomer when silver dosage was 2796 ppm by dry weight based on total dry weight of the coating composition (mole ratio of the heterocyclic group in the heterocyclic group-containing monomer to silver was 2, which was less than required 4), and had a poorer coating heat stability. It suggested the significant role played by the mole ratio of the heterocyclic group in the heterocyclic group-containing monomer to silver in coating heat stability.

EDTA was a molecular that could bind metal ions, such as silver in the present invention. But EDTA was not polymerizable. Comparative Coating Compositions 10 and 11 comprises respectively 0.35% and 0.70% by dry weight based on total dry weight of the coating composition, EDTA, and the mole ratios of EDTA to the silver was respectively 5 and 10. Coating Compositions 10 and 11 both showed poor coating heat stability. It suggested that although EDTA could bind metal ions, it could not bring benefits to coating heat stability.

What is claimed is:

1. An antimicrobial coating composition comprising (i) a polymer emulsion and (ii) from 20 ppm to 6000 ppm, by dry weight based on total dry weight of the coating composition, a silver, wherein the polymer emulsion comprises a copolymer having, as polymerized units, (a) ethylenically unsaturated nonionic monomers, and (b) from 0.01% to 2%, by dry weight based on total dry weight of the polymer emulsion, heterocyclic group-containing monomers and wherein the mole ratio of heterocyclic groups in the heterocyclic group-containing monomers to silver is at least 4, (iii) one or more pigment, one or more extender, or both one or more pigment and one or more extender, at a pigment volume concentration of 10 to 75%, and optionally, a surfactant, wherein, excluding the optional surfactant, there is only one polymer in the composition.

2. The antimicrobial coating composition according to claim 1 wherein the ethylenically unsaturated nonionic monomer is selected from the group consisting of styrene, $C_2$-$C_{12}$ alkyl esters of (methyl) acrylic acids, derivatives thereof, and any combinations thereof.

3. The antimicrobial coating composition according to claim 1 wherein the heterocyclic group-containing monomers are polymerizable derivatives of imidazole, thiophene, pyrrole, oxazole, thiazole, tetrazole, pyridine, pyridazine, pyrimidine, pyrazine, azole, indazole, triazole, their isomers, and any combinations thereof.

4. The antimicrobial coating composition according to claim 1 wherein the polymer emulsion further comprises, as polymerized units, by dry weight based on total dry weight of the polymer emulsion, (c) from 0.01% to 5%, stabilizer monomers.

5. The antimicrobial coating composition according to claim 1 wherein the silver is a silver solution and is selected from the group consisting of silver nitrate, silver iodide, and the combination thereof.

6. The antimicrobial coating composition according to claim 1 further comprising, by dry weight based on total dry weight of the coating composition, from 0.004% to 10%, an oxidant.

7. The antimicrobial coating composition according to claim 6 wherein the oxidant is selected from the group consisting of peroxide, halogen acid, hypohalous acid, halous acid, perhalogen acid, their lithium, sodium and calcium salts, and any combinations thereof.

8. An antimicrobial coating composition comprising (i) a polymer emulsion and (ii) from 20 ppm to 6000 ppm, by dry weight based on total dry weight of the coating composition, a silver, wherein the polymer emulsion comprises a copolymer having, as polymerized units, (a) ethylenically unsaturated nonionic monomers, and (b) from 0.01% to 2%, by dry weight based on total dry weight of the polymer emulsion, heterocyclic group-containing monomers and wherein the mole ratio of heterocyclic groups in the heterocyclic group-containing monomers to silver is at least 4 wherein the heterocyclic group-containing monomers comprise vinyl imidazole.

9. The antimicrobial coating composition of claim 1 wherein the mole ratio of heterocyclic groups in the heterocyclic group-containing monomers to silver is at least 7.

10. The antimicrobial coating composition of claim 1 the mole ratio of heterocyclic groups in the heterocyclic group-containing monomers to silver is at least 9.

11. An antimicrobial coating composition comprising (i) a polymer emulsion of a copolymer and (ii) from 20 ppm to 6000 ppm, by dry weight based on total dry weight of the coating composition, a silver, wherein the copolymer comprises, as polymerized units, (a) ethylenically unsaturated nonionic monomers, and (b) from 0.01% to 2%, by dry weight based on total dry weight of the polymer emulsion, heterocyclic group-containing monomers and wherein the mole ratio of heterocyclic groups in the heterocyclic group-containing monomers to silver is at least 4, and (iii) one or more pigment, one or more extender, or both one or more pigment and one or more extender in amount of 10 to 75% pigment volume concentration, and optionally (iv) oxidant in amounts of 0.004 to 10% by dry weight of the coating composition, wherein the amount of the polymer emulsion of the copolymer makes up the remainder of the dry weight of the coating composition.

12. An antimicrobial coating composition comprising (i) a polymer emulsion and (ii) from 20 ppm to 6000 ppm, by dry weight based on total dry weight of the coating composition, a silver, wherein the polymer emulsion comprises a copolymer including, as polymerized units, (a) ethylenically unsaturated nonionic monomers, and (b) from 0.01% to 2%, by dry weight based on total dry weight of the polymer emulsion, heterocyclic group-containing monomers and wherein the mole ratio of heterocyclic groups in the heterocyclic group-containing monomers to silver is at least 4, wherein the polymer of the polymer emulsion further comprises, as polymerized units, by dry weight based on total dry weight of the polymer emulsion, (c) from 0.01% to 5%, stabilizer monomers.

13. The antimicrobial coating composition of claim 12 wherein the composition comprises 20 to 3000 ppm of the silver.

14. The antimicrobial coating composition of claim 8 wherein the composition comprises 20 to 3000 ppm of the silver.

* * * * *